United States Patent
Parkhideh

[19]

[11] Patent Number: 5,946,317
[45] Date of Patent: Aug. 31, 1999

[54] MULTI-MASTER SUPERVISORY SYSTEM

[75] Inventor: Mehrali Parkhideh, Half Moon Bay, Calif.

[73] Assignee: Harris Corporation, Melbourne, Fla.

[21] Appl. No.: 08/083,561

[22] Filed: Jun. 30, 1993

[51] Int. Cl.⁶ .................................................. H04L 12/56
[52] U.S. Cl. ............................................................ 370/410
[58] Field of Search ............................. 370/94.1, 60, 61, 370/85.1, 8, 85.13, 85.14, 85.15, 400, 401, 402, 403, 410; 340/825.05, 825.06

[56] References Cited

U.S. PATENT DOCUMENTS

| | | | |
|---|---|---|---|
| 4,942,574 | 7/1990 | Zelle | 370/85.15 |
| 5,172,372 | 12/1992 | Konishi | 370/85.13 |
| 5,181,200 | 1/1993 | Harrison | 370/85.1 |
| 5,229,988 | 7/1993 | Marbaker | 370/94.1 |
| 5,243,543 | 9/1993 | Notess | 370/13 |
| 5,255,268 | 10/1993 | Cato et al. | 370/94.1 |

FOREIGN PATENT DOCUMENTS

| | | |
|---|---|---|
| 0328435 A1 | 8/1989 | European Pat. Off. . |
| 0467569 A1 | 1/1992 | European Pat. Off. . |

OTHER PUBLICATIONS

Douglas E. Comer, Internetworking with TCP/IP, pp. 73–87, 1991 by Prentice–Hall, Inc.

*Primary Examiner*—Chau Nguyen
*Attorney, Agent, or Firm*—Rogers & Killeen

[57] ABSTRACT

A supervisory system for a network of communications stations in which a response to a query to one station may be received and interpreted by a plurality of other stations in the network. Upon receipt of a command from a master station, a slave station sends a responsive signal that includes the identity of the command. Each master station monitors the network and keeps track of the status of each slave station by updating its status records upon receipt of one of the responsive signals containing the command identity. Each master station operates independently and all of the stations may be master stations. The multiple master stations may each attempt to exert control over the slave stations in the network at any time.

15 Claims, 2 Drawing Sheets

| DESTINATION I.D. | SOURCE I.D. | NODE ENTRY I.D. | DATA | OTHER I.D. | COMMAND I.D. |

MULTI-MASTER SUPERVISORY SYSTEM

BACKGROUND OF THE INVENTION

The present invention is directed to a method and system for controlling slave station activities in a communications network in which any number of master stations may independently assert control at any time, and more particularly to a supervisory system for a network of stations that communicate data, video and/or telephone signals using media in which any one of the communications stations may be used to monitor and/or control the activities at any other station.

A supervisory system for a network of communications stations typically uses a master station to control and monitor the status of the other stations (collectively referred to herein as slave stations) in the network. Any station in the network, including slave stations may send and receive messages that may be addressed to one or more of the other stations. The master station sends commands to the slave stations and keeps track of their status. For example, a master station in New York can control and monitor the status of a remote, unmanned cite in West Virginia by sending commands, such as directions to perform a function, and periodic requests for information (e.g., operating capability of each piece of equipment, communications backlog, unauthorized entry into the facility, etc.) The master station may use any appropriate communication medium to communicate with the slave stations, including radio, land lines, local or wide area network connections, etc. Each station may include appropriate computer equipment (e.g., processor, modem, etc.) to be able to function in the network, and appropriate transmission and reception equipment for the data, video, telephone signals, and the commands. Typically, upon receiving a command, a station will send a responsive message to the sender.

Such systems have several disadvantages. For example, when the master station requests status information, and such information has been provided by the slave station, the slave station clears the reported information (known as "latched" or "time stamped" information). Thereafter, any other station sending a status inquiry would not receive the previous information and receives the current status (known as "on the fly" information) (after all, from the slave station's point of view, the information has been provided to the only station that needs to know the information). Further, even if a slave station were to monitor the network, it probably would not hear the questions and answers together and would thus be unable to determine the status of other stations. For example, a slave station responding to a request for the status of an antenna coupler may reply simply, "up" or "down". Without knowing the question, a listener would be unable to learn anything from the transmission.

Further, while such systems may adequately support the functions at the master station, they do not provide flexibility so that the functions of the master station may be performed at a slave station. For example, a maintenance worker at a slave station may need to know how a particular action he is taking affects the remainder of the network, but cannot unless he establishes a separate communications link with the master station that, at best, would be able to provide a delayed indication of network reaction.

As is apparent, the master station plays an important role in operating the network and various back-up systems for the master station have been devised. For example, one of the slave stations may be configured to assume the duties of the master station, should the master station fail. While this system may present a cost effective procurement option, the system is not likely to be able to bring the slave station on line as a master station quickly enough to prevent gaps in control and loss of data.

A more costly approach is to provide tandem master stations, both being on line and operating as masters. However, neither is aware of the actions of the other and most master station commands are duplicated. For example, a network having master stations at New York and Chicago would send duplicate status inquiries to a West Virginia slave station. In addition, such systems are difficult to set up and maintain because of synchronization (connection and protocol) problems inherent with two master stations.

Existing supervisory systems that include more than one master station also do not afford much flexibility in network design and/or reconfiguration. For example, in prior art systems once the network configuration has been set (including the number of master stations), the number and/or configuration of the master stations cannot later be changed (or changed only with substantial difficulty) to accommodate changed requirements.

By way of example, Badger Technology, Inc. of Milpitas, California manufactures a Dodge 2000™ monitoring and control system typical of prior art systems.

The system and method of the present invention may be implemented in existing computer networks that have plural slave stations that receive commands from a master station, such as local or wide area networks. More particularly, and with reference to FIG. 1, the system and method of the present invention may find application in communications networks having plural stations, such as stations N1–N26 shown in FIG. 1. The stations may be arrayed linearly, in a star, or in loops, with any arrangement of interconnections. In an existing communications network in which the present invention may be used, the stations communicate data using microwave radio transmissions. Such networks are well known in the art and need not be described in detail for an understanding of the present invention. See, for example, the network in application Ser. No. 833,233 whose inventorship and ownership is the same as this application, or the network in U.S. Pat. No. 4,319,338 issued Mar. 9, 1982 to Grudowski, et al.

The term communications network, as used herein, refers to an entire network of stations that communicate with each other, or a portion of such a network (e.g., one of the loops L1–L3 of FIG. 1), that is under the control of the supervisory system of the present invention.

Accordingly, it is an object of the present invention to provide a novel system and method for supervising a communications network with multiple masters that obviates the problems of the prior art.

It is a further object of the present invention to provide a novel system and method for supervising a communications network in which any number of master stations may independently attempt to exercise control over the slave stations at any time.

It is still a further object of the present invention to provide a novel system and method for supervising a communications network in which multiple master stations actively and continuously monitor the communications between stations in the network.

It is yet a further object of the present invention to provide a novel system and method for supervising a communication network in which commands from multiple master stations are identified in command-responsive signals from the slave stations so that master stations are aware of the status of the slave stations.

It is another object of the present invention to provide a novel communications network with multiple master stations in which each master station monitors the status of all of the slave stations and attempts to act as the master of the entire network.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figures 1, 2:
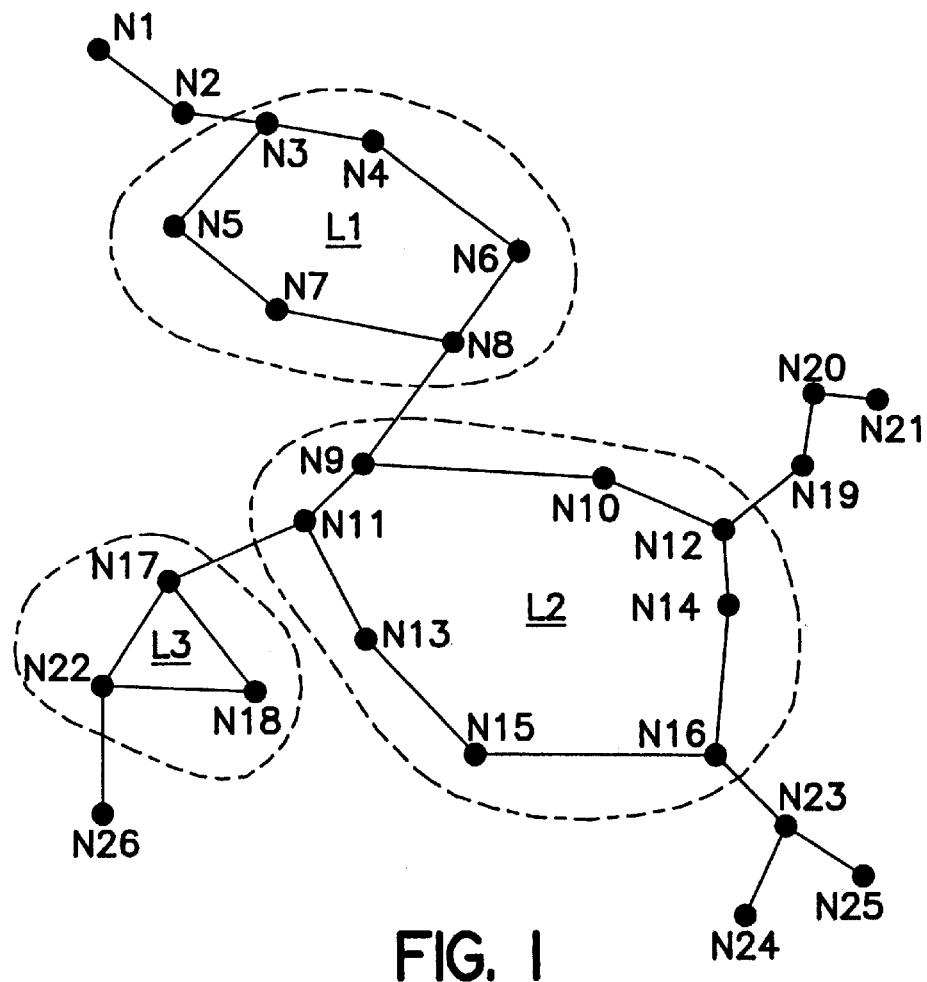
FIG. 1 is a schematic diagram of a communications network in which the present invention may find application.
FIG. 2 is a block diagram of a data packet structure.

The system and method of the present invention may be implemented in a communications network having plural stations communicating through a communications medium, such as any of those discussed above in the Background of the Invention.

In the system and method of the present invention, the traditional demarcation between slave station and master station found in the prior art is eliminated. All or some of the stations in the network may be masters, and all or some of these master stations may have other functions (for example, performing the functions of a slave station). Each master station of the present invention may, if given the privileges of a master, perform the same functions as the single master station of the prior art systems; that is, it may monitor the status of the slave stations and issue commands to control their operation.

In contrast to the prior art, the present invention includes multiple master stations that all may monitor the communications among the stations in the network and are able to determine the status of any other station, master or slave (references to slave stations also refer to those master stations that perform slave station functions). Further, when given the privileges of a master station, each of the master stations herein may attempt to independently exercise control over all of the slave stations at any time. Note that the ability to perform all of the functions of a master that are part of the present invention may be limited by the privileges given to a station by a network controller (for example, a station of the present invention may be given the privileges of monitoring the status of other stations, but not the privileges of giving operational commands). Nevertheless, the flexibility to have any station be a master is a significant enhancement of the present invention. The master stations of the present invention are so named regardless of the privileges accorded.

So that the master stations may monitor slave stations status, the slave stations, in response to receipt of a command from a master station, transmit a signal that includes the identification of the command received. Preferably, the identity of the command is contained in the signal normally sent by a slave station in response to a command, although this is not required. Each master station monitors the communications medium connecting the stations and records, stores or otherwise notes the identification of the command and the response so that each master knows the status of the stations in the network. The responsive signals identify the nature of the command and contain sufficient information so that any observing master station would be able to reconstruct the command as if it had generated it.

For example, in a network having a protocol requiring signals sent through the communication medium to be in packets that contain:

destination address/originator address/loop entry addresses/data/check sum, a responsive signal from a slave station receiving a command from a master station of the present invention includes a command identifier in the packet. The protocol may be changed in various ways, for example to:

originating master's address/responding slave's address/loop entry addresses/data/command identifier/check sum See FIG. 2

The command identifier may take various forms, with preferred embodiments being terse, but understandable. For example, the commands available to the master stations may be placed in a look-up table that is accessible by both slave and master stations (or copied into each station.) The protocol includes instructions to enter the look-up table so that the command may be quickly identified. Commands may be given numeric or alpha-numeric identifiers (e.g., a request for status of an antenna coupler may be command "A12").

In another preferred embodiment that may be more appropriate where the number of commands makes a look-up table impractical, the commands may be encoded, although some additional computation may be required by master and/or slave to encode/decode the commands. The encoding and decoding computation may use any available encryption system. The commands may also be repeated (e.g., echoed) in the responsive signal from the slave station, albeit with some cost in communication time.

Figure 3:
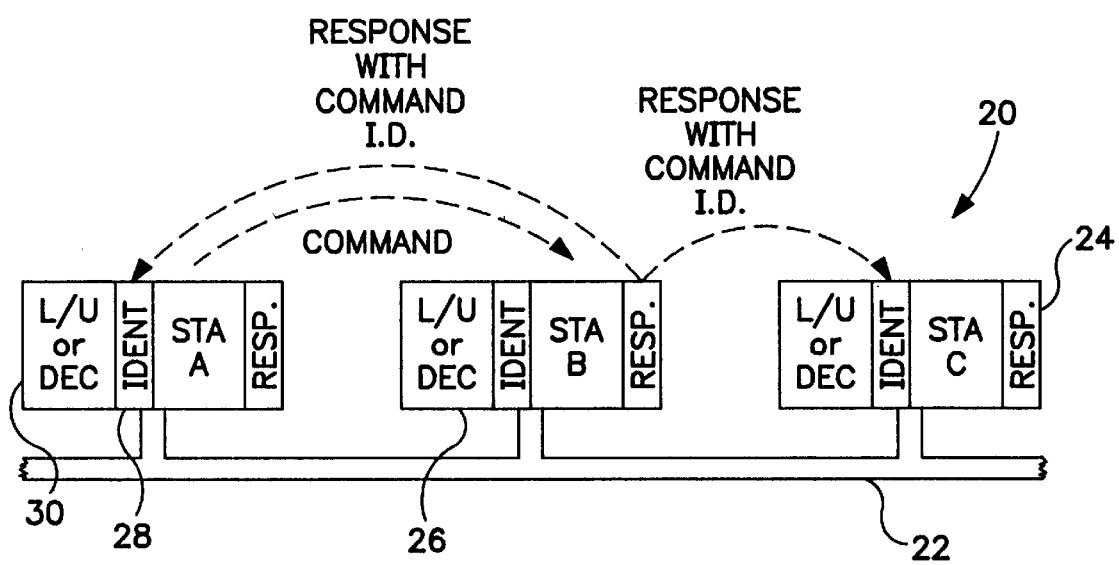
FIG. 3 is a block diagram of an embodiment of the present invention.

With reference to FIG. 3, an embodiment of the present invention may include plural stations 20 that communicate through a communication medium 22. The stations 20 may have transmitters 24 that send a response to a command from a master station, the response including the identity of the command received, and monitors 26 that may include receivers 28 for receiving responses from other stations and devices 30, such as look-up tables or decoders for identifying the command.

Each station may be reconfigured by adding a computer processor, if needed, to be able to perform the monitoring function. Typically, however, no reconfiguration will be required as most stations in available communications networks already have sufficient computing capability. Each Master must be capable of following other activity in real time. This is usually achieved by fast CPUs relative to slower communication channel throughput. Each monitoring station must have the capability of allowing a master to physically connect and logically see the activity of the system. By way of example, Harris Farinon Canada, Inc. of Dorval, Quebec manufactures a Farscan™ network management system and VersaT1lity™ digital alarm remote assemblies.

As to specific protocol, the packet structure may conveniently have the form of that shown in FIG. 2. As shown in FIG. 2, the packet may contain distinction identification, source identification, node entry identification, data, other identification and command identification in the order set out.

In operation, each master station attempts to exert control over the slave stations in the network. One of the master stations will provide a command to a slave station first, and any other master station preparing to send the same command to the same slave station would, through its monitoring function, learn that the command was already sent and abandon its attempt. The second master station would, however, update its status of the slave station. Should the same command be sent from two master stations (e.g., in the event the second master sent the command before receipt of the responsive signal from the slave station), the slave may be instructed to ignore the second command, or to respond again. All of the master stations may be given identical instructions (e.g., they may be clones) to avoid contradictory commands.

Any number of master stations may be placed in the network, and, in the event the slave stations are adaptable, all of the stations may be master stations (some or all also performing slave station functions). The master stations do not need to communicate directly with each other outside the normal network communication described above. Further, should any of the master stations fail, the network would not sense any difference in control because the remaining master stations' actions will be identical to those of the failed master station.

In an alternative embodiment, a master station with slave station capability may be selectively changed to a slave station without master station capability by, for example, disconnecting the master station functions from the network. This feature may be appropriate where more stations include a master capability than required, and energy, communicating time, etc. may be conserved by deactivating the excess master stations.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A supervisory system for a communications network having a plurality of stations communicating through a communication medium, the system comprising:

plural of said stations being master stations that operate at the same time to attempt to control a plurality of other said stations by sending commands thereto;

response means at each of said stations for sending a signal through the communication medium in response to a command sent thereto and received from any of said master stations, said signal identifying the command received; and identification means at each of said master stations for receiving said signal and identifying the command in the signal so that each of said master stations is aware of commands sent by every other one of said master stations.

2. The system of claim 1 comprising more than two of said master stations.

3. The system of claim 1 wherein all of said stations are master stations.

4. The system of claim 1 wherein said signal contains the command received.

5. The system of claim 1 wherein said identification means comprises a look-up table containing the commands sent by said master stations and said signal contains instructions to locate the command in said look-up table.

6. The system of claim 1 wherein said identification means comprises a decoder for identifying the commands sent by said master stations and said signal contains a coded command.

7. A communication network comprising:

a plurality of master stations that control a plurality of slave stations at the same time; and monitor means for making each of said master stations aware of the status of each of said slave stations by identifying commands received by said slave stations from any of said master stations.

8. The network of claim 7 comprising more than two of said master stations.

9. The network of claim 7 further comprising response means at each of said slave stations for sending a signal identifying a command sent thereto from one of said master stations, and wherein said monitor means comprises means for identifying commands in signals sent by said slave stations in response to receipt of the commands from said master stations.

10. A method of simultaneously controlling operation of plural slave stations with plural master stations connected in a communications network through a communication medium, the method comprising the steps of:

providing means at each of said slave stations for sending signals on said communication medium in response to receipt of commands from any of said master stations, said signals identifying the commands received; and providing means at each of said master stations to monitor said signals so that each of said master stations is aware of the status of each of said slave stations.

11. The method of claim 10 further comprising the step of providing a look-up table containing the commands that may be sent from said master stations to said slave stations.

12. The method of claim 10 further comprising the step of providing means at said master stations to encode and to decode the commands.

13. A method of controlling operation of plural slave stations with plural master stations in a communications network, the method comprising the steps of:

sending commands from any of said master stations to said slave stations;

sending signals from said slave stations in response to receipt of the commands, said signals identifying the commands received; and monitoring said signals at said master stations so that each of said master stations is aware of the status of each of said slave stations.

14. The method of claim 13 further comprising the step of encoding the commands in said signals.

15. The method of claim 13 further comprising the step of placing the commands in a look-up table and identifying the commands by reference to the look-up table.

* * * * *